United States Patent [19]

Nattel et al.

[11] Patent Number: 5,312,142
[45] Date of Patent: May 17, 1994

[54] CONNECTOR FOR CONNECTING A SECTION OF CORRUGATED CONDUIT TO ANOTHER COMPONENT

[75] Inventors: William Nattel, Montreal; Alain Michaud, St. Luc, both of Canada

[73] Assignee: Commander Electrical Materials, Inc., Saint-Jean-sur-Richelieu, Canada

[21] Appl. No.: 2,552

[22] Filed: Jan. 11, 1993

Related U.S. Application Data

[62] Division of Ser. No. 489,140, Mar. 5, 1990, Pat. No. 5,200,209.

[30] Foreign Application Priority Data

Sep. 29, 1989 [CA] Canada .................................. 6150110

[51] Int. Cl.[5] ............................................. F16L 35/00
[52] U.S. Cl. ...................................... 285/304; 285/319; 285/903
[58] Field of Search .......................... 285/319, 304, 903

[56] References Cited

U.S. PATENT DOCUMENTS

| | | | |
|---|---|---|---|
| 3,224,800 | 12/1965 | Fisher | 285/319 X |
| 4,575,133 | 3/1986 | Nattel | 285/319 |
| 4,969,670 | 11/1990 | Bonnema et al. | 285/903 X |
| 5,094,482 | 3/1992 | Petty et al. | 285/903 X |

FOREIGN PATENT DOCUMENTS 1173895 12/1969 United Kingdom ................ 285/319

*Primary Examiner*—Dave W. Arola
*Attorney, Agent, or Firm*—M. J. Moran

[57] ABSTRACT

A method and apparatus for producing plastic parts with a resilient projection, such as connectors for corrugated tubing. The method comprises the steps of flowing plastic material on a core provided with a recess to mould the resilient projection, camming the resilient projection out of the recess, after the mass of plastic material is solidified and extracting the solidified part from the core. The invention also extends to a novel connector for corrugated tubing.

8 Claims, 5 Drawing Sheets

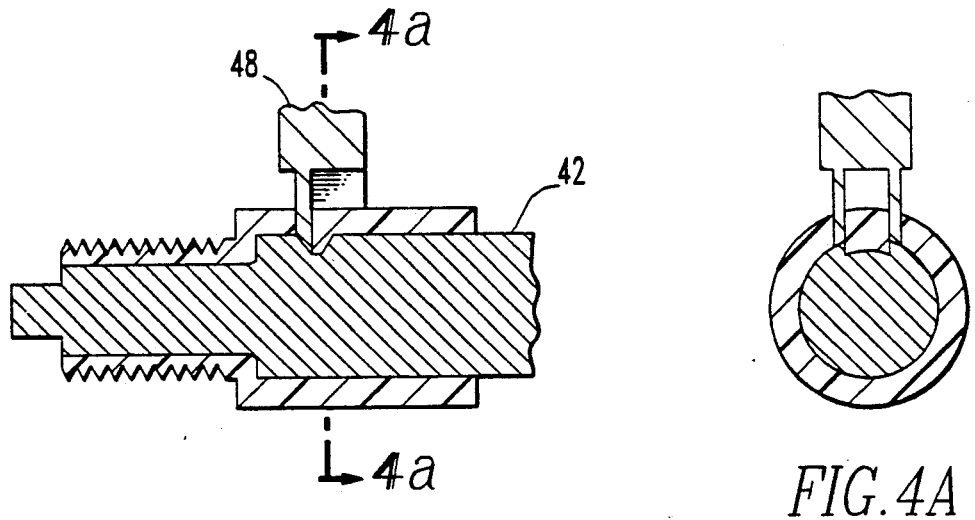
FIG. 4
FIG. 4A
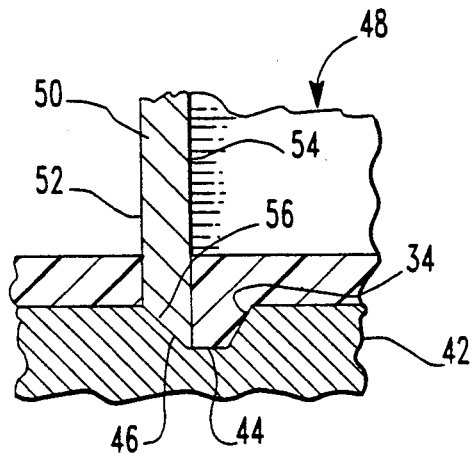
FIG. 4B
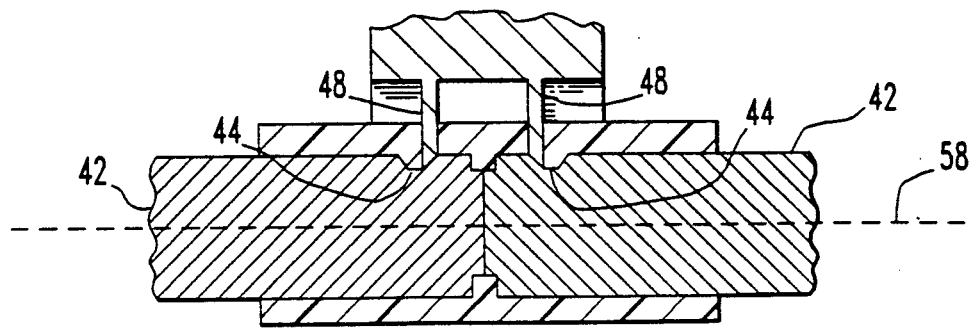
FIG. 5

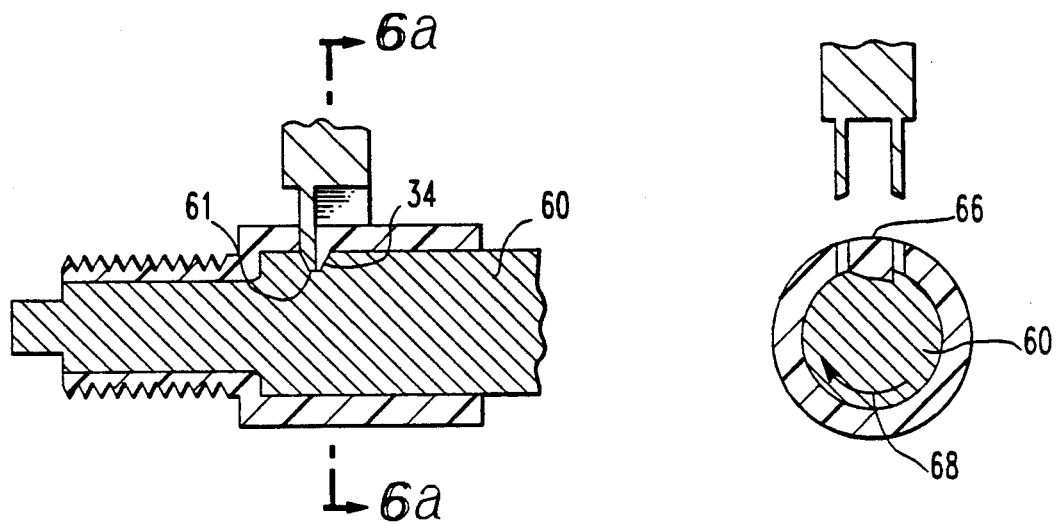
FIG.6
FIG.6A
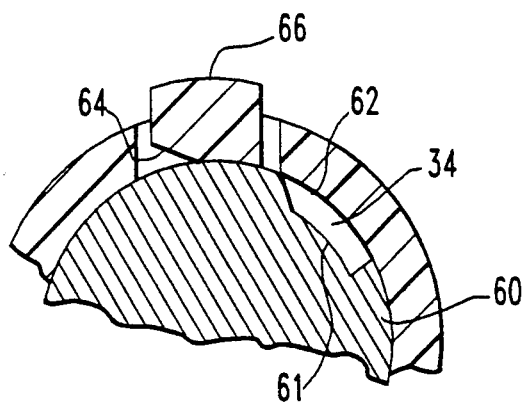
FIG.6B

CONNECTOR FOR CONNECTING A SECTION OF CORRUGATED CONDUIT TO ANOTHER COMPONENT This is a division of application Ser. No. 07/489,140 filed Mar. 5, 1990 now U.S. Pat. No. 5,200,209.

FIELD OF THE INVENTION

The invention relates to the art of moulding plastic parts with a resilient projection, such as connectors for corrugated tubing. More specifically, the invention relates to a solid core with a self-acting cam to facilitate the withdrawal of a solidified plastic part when the moulding cycle is completed. The invention also extends to an improved shaping mould, a moulding process and the product obtained thereby.

BACKGROUND OF THE INVENTION

Corrugated plastic conduit has started to replace electrical metallic conduit as a raceway for insulated conductors. In order to attach the electrical conduit to an enclosure or to connect the two ends of the conduit together, connectors are used which can either be glued or attached mechanically to a plastic corrugated conduit. Connectors of the type disclosed in applicant's U.S. Pat. No. 4,575,133, issued on Mar. 11, 1986, have found good market acceptance because of the ease of installation. Such a connector comprises a cavity receiving the extremity of the conduit, in which protrude one or more resilient tongues. Each tongue has an oblique camming surface facing the conduit entry end of the cavity and an opposite vertical locking face. In order to attach the connector to the conduit, the electrician has only to cut the conduit to the required length and insert it into the cavity of the connector. During the insertion operation, the ribs on the conduit cam the tongues out of the way allowing the conduit to slide easily past the tongues. Once fully inserted, the conduit is prevented from being pulled out of the connector by virtue of the interference created between the locking faces of the resilient tongues and a conduit corrugation.

The connectors for a corrugated conduit are normally manufactured by the well known injection moulding process. A typical set-up used for this purpose comprises a solid core positioned into the shaping mould to form the conduit receiving cavity of the connector. On the core is machined a recess to form the resilient tongue of the connector. At the end of the moulding cycle, after the part is cooled and the plastic material has solidified, the mould opens apart along the parting line and the connector is stripped of the core using an ejector assembly. A difficulty arises because of the interference created between the locking face of the tongue and the recess on the core. Should one try to eject the connector, the projection will likely be sheared off.

One method to solve this problem is to use a collapsible core of the type described in the U.S. Pat. Nos. 3,247,548 and 3,660,001. This core, although commercially produced, is expensive and difficult to maintain as the plastic material in fluid state may enter the core joints and cause a malfunction. In addition, the moulding operation is slowed down because of poor heat transfer between the cooling medium, the core and the moulded part.

Another approach is to use a two part connector of the type commercialized under the trademark KWIKON. One part of the connector contains the holding tongues and the other part is an outer ring pressed on the connector body. The tongues are very flexible in order to allow the removal from the core and by themselves they have no power to prevent the forceful removal of the conduit from the connector. The ring, when pressed on the connector, holds the tongues more rigidly in place. This type of connector operates well, however, the production methods are fairly costly as the two parts have to be moulded separately and then assembled.

OBJECT AND STATEMENT OF THE INVENTION

An object of the present invention is an improved process and apparatus for moulding a part of plastic material with a resilient projection such as a connector for corrugated conduit (hereinafter the term "connector" is intended to encompass a device used to join two sections of corrugated conduit as well as a device to couple a section of corrugated conduit to another component), allowing to easily free the solidified part from the moulding equipment.

In accordance with the invention, there is provided a process for moulding a part of plastic material with a resilient projection, comprising the steps of flowing fluid plastic material around a solid core provided with a recess to mould the resilient tongue, camming the tongue out of the core recess after the plastic material has solidified, and separating the solidified part from the core.

In a preferred embodiment, two cooperating cores are provided to carry out the molding process, namely a first core member comprising a tongue moulding recess with a camming surface therein, which assists to raise the resilient tongue out of the recess during the stripping operation, and a second core member which fits into the recess during the moulding cycle to form a barrier isolating the camming surface from the flow of plastic material at the mould filling stage, thus preventing the camming surface to alter the shape of the locking tongue. After the mass of plastic material has solidified, the second core member is removed from the recess and the stripping operation is carried out normally, the camming surface smoothly raising the tongue from the recess to prevent any damage. This embodiment is highly advantageous because it allows to mould the resilient tongue with a relatively wide locking face with no reduction in its holding power and, at the same time, allowing to greatly ease the stripping operation.

In a variant, no barrier element is used in association with the camming surface in the recess, whereby the camming surface leaves an impression on the resilient tongue. It will be appreciated that this arrangement provides two camming surfaces on the resilient tongue, namely a primary camming surface for retracting the tongue during the insertion of the corrugated conduit in the connector, and a secondary camming surface used to raise the tongue out of the core recess at the end of the moulding cycle.

In a first embodiment under the variant, the secondary camming surface is provided on the side of the tongue necessitating a rotational movement between the solidified connector and the core to cam the resilient tongue out of the core recess. This embodiment has a disadvantage in that it requires a more complex moulding equipment required to rotate the core contributing to an increase of the manufacturing costs of the mould.

In a second embodiment under the variant, the secondary camming surface is provided on the locking face of the resilient tongue. Although this embodiment allows to use a standard stripping technique, it reduces the effective area of the locking face, thus degrading the tongue holding power.

In addition to the core construction described above, the invention also extends to the mould assembly for carrying out the moulding process and to a connector for a corrugated conduit. It should also be appreciated that the invention is not limited to the manufacture of such connectors, but may also be applied for moulding other plastic parts having a resilient tongue.

In summary, the present invention comprises in a general aspect a process to produce a part of plastic material having a resilient tongue, the process comprising the steps of:
- providing a core with a recess;
- flowing plastic material in a fluid state around the core and within the recess, when solidifying the plastic material forms the part with the resilient tongue received in the recess;
- camming the resilient tongue out of the core recess; and
- separating the solidified part from the core.

Further, the invention comprehends a solid core for use with a shaping mould to produce a part of plastic material having a resilient tongue, the solid core comprising:
- a body;
- a recess in the body to receive a mass of plastic material in fluid state which solidifies to form the tongue;
- a camming surface in the recess to raise the tongue out of the recess as a result of a sliding contact between the tongue and the core.

The invention also extends to a connector for connecting a section of a corrugated conduit to another component, the corrugated conduit being of the type having longitudinally spaced apart circular ribs, the coupling comprising:
- a generally cylindrical body-portion having an extremity defining a conduit entry end;
- a resilient finger mounted to the body-portion, the resilient finger including a locking tongue extending radially with respect to the body-portion for engagement with a rib of the section of corrugated conduit; and
- two camming surfaces on the tongue to communicate a yielding motion to the resilient finger as a result of the sliding contact between the tongue and a member moving in either of two different directions.

BRIEF DESCRIPTION OF THE DRAWINGS

FIG. 4 is a schematical view of a core assembly in accordance with the invention;

FIG. 4a is a cross-sectional view taken along lines 4a—4a in FIG. 4;

FIG. 4b is an enlarged view depicting the interrelation between the cores shown schematically in FIG. 4;

FIG. 5 is a cross-sectional view of a core assembly for moulding a connector with two resilient projections for joining two corrugated conduits together;

FIG. 6 is a schematical view of a core assembly in accordance with a first variant;

FIG. 6a is a cross-sectional view taken along lines 6a—6a in FIG. 6;

FIG. 6b is an enlarged view of the core assembly shown in FIG. 6, depicting the camming action of the inner core to raise the resilient tongue of the connector from the recess on the inner core;

Throughout the drawings, analogous elements are designated by the same reference numerals.

DESCRIPTION OF PREFERRED EMBODIMENTS

Figure 1:
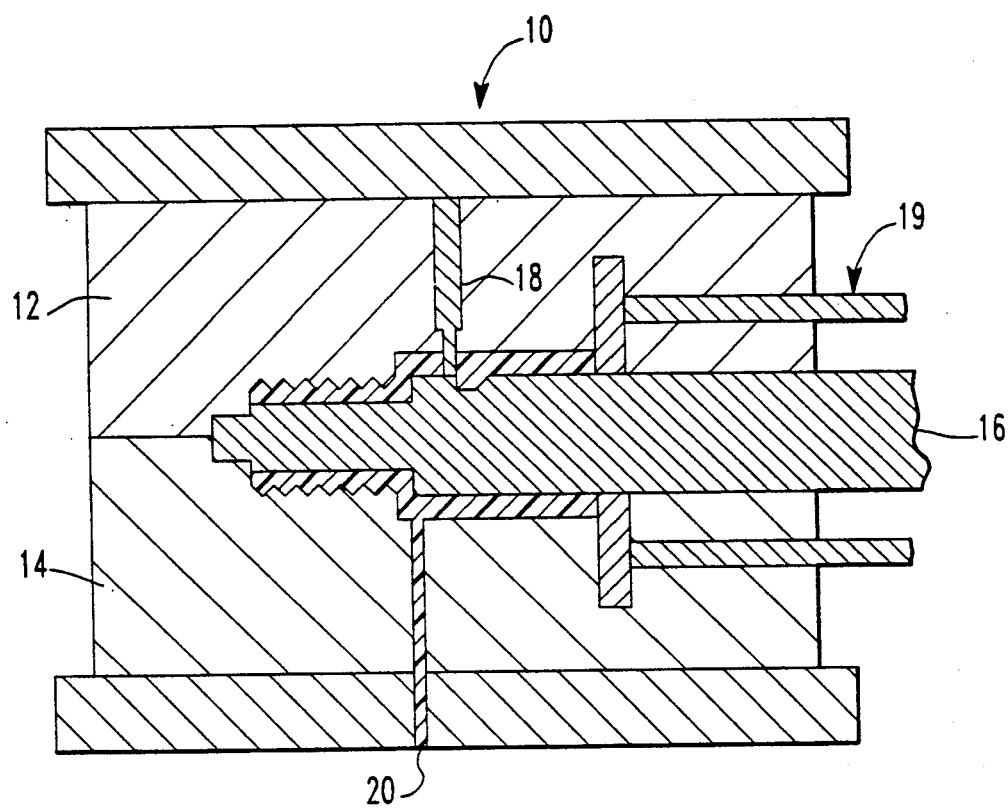
FIG. 1 is a vertical sectional view of a conventional moulding assembly for manufacturing connectors for corrugated tubing.
Figure 2B:
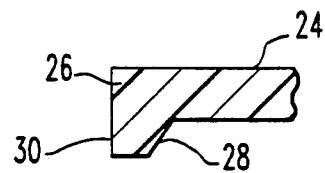
FIG. 2b is a cross-sectional view of the resilient tongue of the connector shown in FIG. 2.
Figure 2:
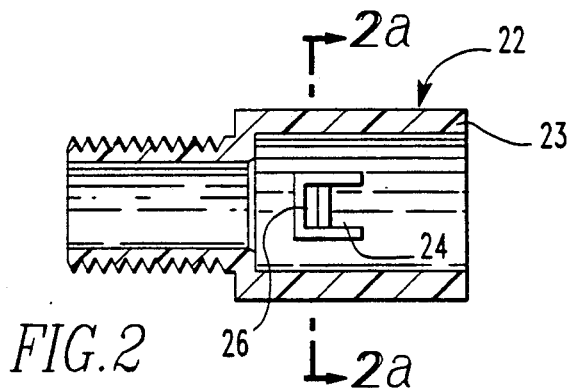
FIG. 2 is a cross-sectional view taken along the symmetry axis of a conduit manufactured by the set-up depicted in FIG. 1.
Figure 2A:
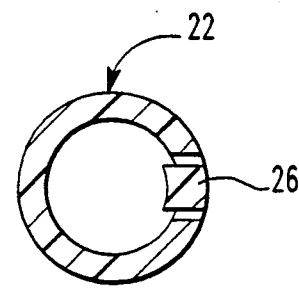
FIG. 2a is a cross-sectional view taken along lines 2a—2a in the FIG. 2.

A conventional moulding assembly for producing connectors for corrugated tubing is schematically depicted in FIG. 1. The moulding assembly 10 comprises mould halves 12 and 14 moveable one with respect to the other and meeting along a parting line. A core assembly comprising an inner core 16 and an outer core 18 defines with the mould halves 12 and 14 a moulding cavity which is filled with plastic material through an injection channel 20. The outer core 18 is fixed on the mould half 12 and moves in unison therewith relatively to the inner core 16.

The assembly 10 also comprises an ejector assembly 19 for extracting the connector from the inner core 16 when the moulding cycle is completed.

The structure of the connector manufactured by the moulding assembly 10 is illustrated in greater detail in FIGS. 2, 2a, 2b, 3 and 3a. The connector 22 has a generally circular body defining a sleeve 23 for receiving an extremity of a section of corrugated tubing. A resilient finger 24 carries a tongue 26 projecting radially inwardly in the cavity of the sleeve 23. The tongue 26 comprises an oblique camming surface 28 facing towards the tubing entry end of the sleeve 23 and an opposite vertical flat locking surface 30.

To form the tongue 26, a recess 32 is machined on the inner core 16, comprising a slanted surface 34 forming the camming surface 28 of the tongue 26, and a vertical face 36 forming the locking surface 30.

Figure 3:
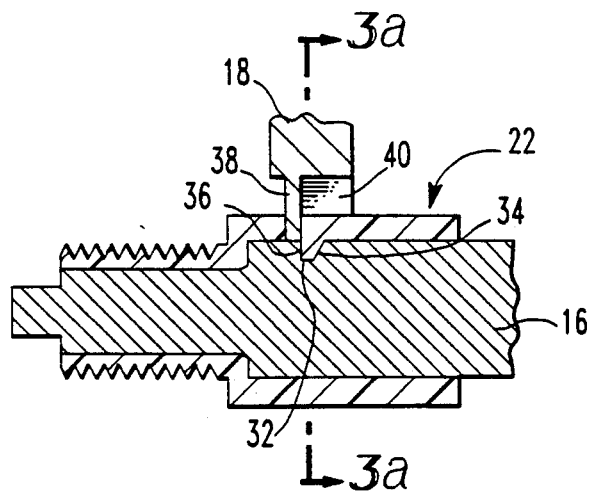
FIG. 3 is a schematical view of a core assembly used in the moulding assembly of FIG. 1.
Figure 3A:
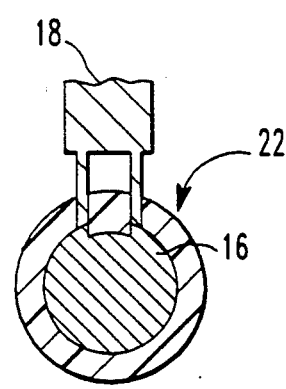
FIG. 3a is a sectional view taken along lines 3a—3a in FIG. 3.
Figures 7, 7A:
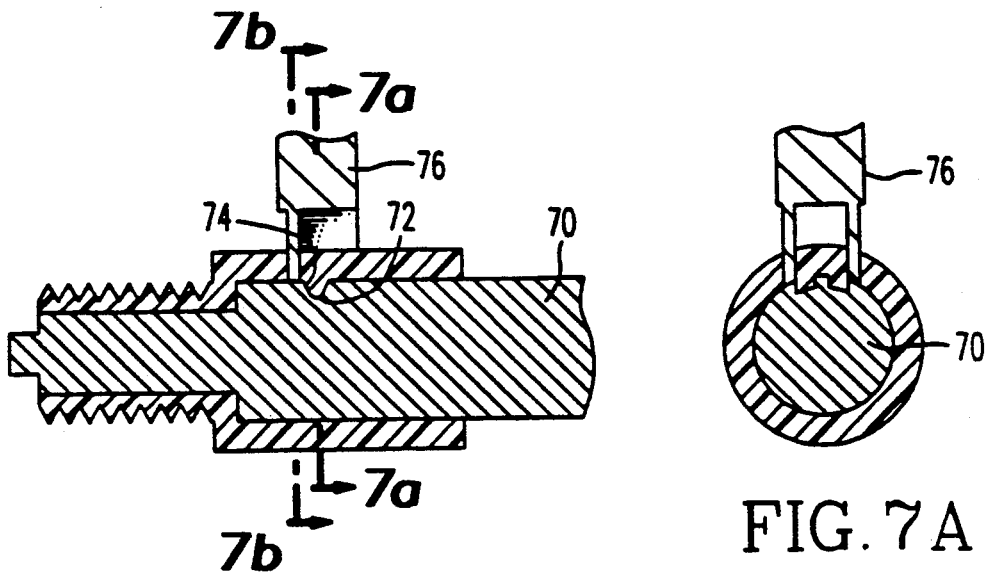
FIG. 7 is a schematical view of a core assembly in accordance with a second variant.
FIG. 7a is a cross-sectional view taken along lines 7a—7a in FIG. 7.
Figure 7C:
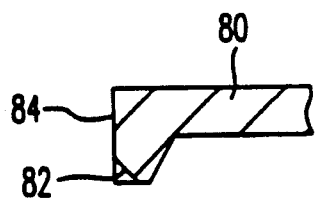
FIG. 7c is a cross-sectional view of the resilient tongue of the connector manufactured by the set-up illustrated in FIG. 7.
Figure 7B:
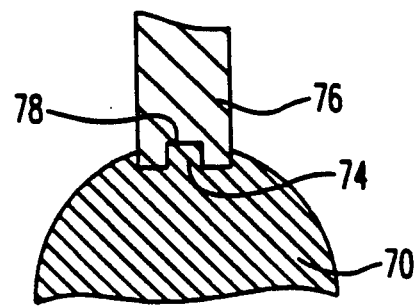
FIG. 7b is a cross-sectional view taken along lines 7b—7b in FIG. 7.

The outer core 18 which comes in contact with the inner core 16 during the moulding cycle is used to free the resilient finger 24 on its three sides. Although not illustrated in the drawings, it will be appreciated that the outer core 18 has a U-shaped structure in cross-section, including two parallel end flanges positioned at a right angle with respect to an intermediate flange. The intermediate flange and one of the end flanges are shown in FIG. 3 and are designated by the numerals 38 and 40 respectively.

A major drawback of the moulding assembly 10 resides in the interference created between the locking surface 30 of the tongue 26 and the conforming surface 36 in the recess 32. If one tries to strip the solidified connector from the inner core 16 using the ejector assembly 19, the tongue 26 will likely be sheared off.

To address this problem, the invention provides an improved core assembly illustrated in FIGS. 4 to 7c. A preferred embodiment of the core assembly is illustrated in FIGS. 4, 4a and 4b, comprising an inner cylindrical core 42 comprising a tongue forming recess 44 provided with a camming surface 46, facing the slanted surface 34 and extending generally in a circumferential direction with respect to the body of the core 42.

The outer core designated by the numeral 48 is also modified by comparison to the outer core 18 previously described. More particularly, the intermediate flange 50 of the outer core 48 comprises sidewalls 52 and 54 and a slanted bottom wall 56 mating with the camming surface 46 in the recess 44 of the inner core 42.

During the moulding cycle, the position of the cores 48 and 42 is as shown in FIG. 4b. It will be appreciated that the outer core 48 partially blocks off the recess 44 in the inner core 42, acting as a barrier element preventing the plastic material to flow in contact with the camming surface 46. It will further be appreciated that the cooperation of the cores 42 and 48 provides a tongue forming recess 44 which is identical in shape to the recess 32 used in conjunction with the prior art moulding assembly 10. Therefore, the arrangement shown in FIGS. 4, 4a and 4b will produce a locking tongue having a shape identical to the locking tongue 26 illustrated in FIG. 2b.

When the moulding cycle is completed, the outer core 48 is moved away from the inner core 42. When the ejector assembly pushes the solidified connector 22 out of the inner core 42, the camming surface 46 will smoothly raise the resilient tongue from the recess 44, allowing to free the connector 22 without any damage thereto.

The same inventive concept may be applied for the construction of a mould to produce a connector with two resilient tongues spaced apart along the centerline of the connector, as illustrated in FIG. 5. Such an arrangement comprises two cores 42 moveable toward and away from each other along the common centerline 58, each core 42 being associated with an outer core 48 received into a respective tongue forming recess 44. The operation of the inner and the outer cores 48 and 42 is identical to the previously described embodiment.

A variant of the core assembly according to the invention is illustrated in FIGS. 6, 6a and 6b. The inner core designated by the reference 60 is provided with a tongue forming recess 61 comprising the oblique surface 34 and a camming surface 62 generally transversal to the oblique surface 34. Contrary to the previously described embodiment, the camming surface 62 is not shielded during the mould filling stage, therefore it will produce an impression on the locking tongue 66. The impression is in the form of a slant designated by the numeral 64.

In order to cam the resilient tongue 66 out of the recess 61, the inner core 60 must be rotated in a clockwise direction as shown by the arrow 68. When the inner core 60 has reached a predetermined angular position and the tongue 66 has been raised from the core 60, as shown in FIG. 6b, a standard ejector assembly may be used to slide the solidified connector off the inner core 60.

This embodiment allows to produce a connector with a locking tongue slightly narrower by comparison to the previous embodiment, yet effective for holding onto the corrugated tubing. However, the mould construction, because of the rotation of the inner core 60 is complicated, especially on multi-cavity moulds. This raises the original cost of the mould and also increases the mould maintenance costs.

A further variant of the invention is illustrated in FIGS. 7, 7a, 7b and 7c.

The cylindrical inner core 70 is provided with a tongue forming recess 72 in which is machined a narrow camming face 74 extending in a generally circumferential direction with respect to the body of the inner core 70. At the level of the camming face 74, the recess 72 is V-shaped in cross-section.

An outer core 76 used to free the resilient tongue on three sides enters the recess 72. The outer core 76 is provided with a notch 78 to clear the camming surface 74.

This arrangement produces a locking tongue 80 provided with a narrow camming face 82 on the locking face 84 of the tongue 80.

At the end of the moulding cycle, once the mass of plastic material has solidified, the mould is opened and the outer core 76 is removed. At that time, a standard ejector is able to strip the connector off the inner core 70 because, while the connector moves forward, the cooperating cam faces 74 and 82 in the recess 72 and on the tongue 80 respectively, raise the tongue out of the recess 72. This method if effective, however, it reduces the width of the locking surface of the tongue, therefore making it the least effective in holding onto the corrugated tubing among all embodiments described herein.

It should be understood that the above description of preferred embodiments of the invention should not be interpreted in any limiting manner since they may be refined in various ways without departing from the spirit of the invention. The scope of the invention is defined in the annexed claims.

The embodiments of the invention in which an exclusive property or privilege is claimed are defined as follows:

1. A connector for connecting a section of corrugated conduit to another component, the corrugated conduit being of the type having longitudinally spaced-apart circular rib members, said connector being of the type molded about a core member and comprising:

a generally cylindrical body-portion having an extremity defining a conduit entry end;

a resilient finger mounted to said body-portion, said resilient finger including a locking tongue extending radially with respect to said body-portion for engagement with a rib member of said section of corrugated conduit;

a first camming surface on said tongue to communicate a yielding motion to said resilient finger as a result of a sliding contact between said tongue and said rib member moving in a first direction during insertion of said corrugated conduit into said conduit entry end;

a second camming surface on said tongue to communicate a yielding motion to said resilient finger as a result of a sliding contact between said tongue and a member moving in a second direction; and at least one locking surface on said tongue engaging said rib member and locking said section of corrugated conduit to said body-portion.

2. A connector as defined in claim 1, wherein one of said two camming surfaces faces towards said conduit entry end.

3. A connector as defined in claim 2, wherein the other of said two camming surfaces is generally opposite to the camming surface facing towards said conduit entry end.

4. A connector as defined in claim 1, comprising a sleeve for receiving therein an extremity of said section of corrugated conduit, said tongue projecting radially inwardly in said sleeve.

5. A connector for connecting a section of corrugated conduit to another component, the corrugated conduit being of the type having longitudinally spaced-apart circular rib members, said connector being of the type molded about a core member and comprising:

a generally cylindrical body-portion having an extremity defining a conduit entry end;

a resilient finger mounted to said body-portion, said resilient finger including a locking tongue extending radially with respect to said body-portion for engagement with a rib member of said section of corrugated conduit;

a first camming surface on said tongue to communicate a yielding motion to said resilient finger as a result of a sliding contact between said tongue and said rib member moving in a longitudinal direction during insertion of said corrugated conduit into said conduit entry end; and a second camming surface on said tongue to communicate a yielding motion to said resilient finger as a result of a sliding contact between said tongue and a member moving in a rotational direction.

6. A connector as defined in claim 5, wherein said first camming surface faces towards said conduit entry end.

7. A connector as defined in claim 6, wherein said second camming surface extends generally transversely to said first camming surface facing towards said conduit entry end.

8. A connector as defined in claim 5, comprising a sleeve for receiving therein an extremity of said section of corrugated conduit, said tongue projecting radially inwardly in said sleeve.

* * * * *